June 14, 1955  J. KEGEL ET AL  2,710,692
FILTER BOTTOMS
Filed July 9, 1951  3 Sheets-Sheet 1
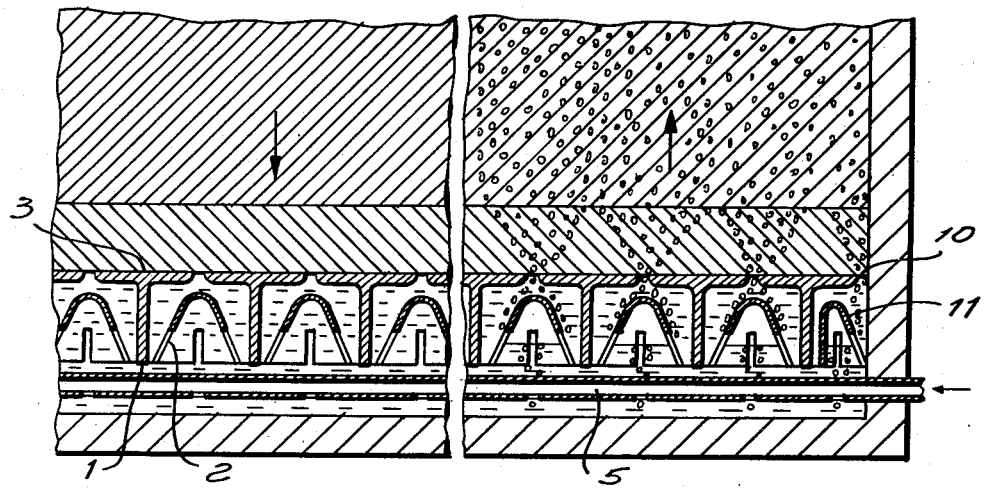
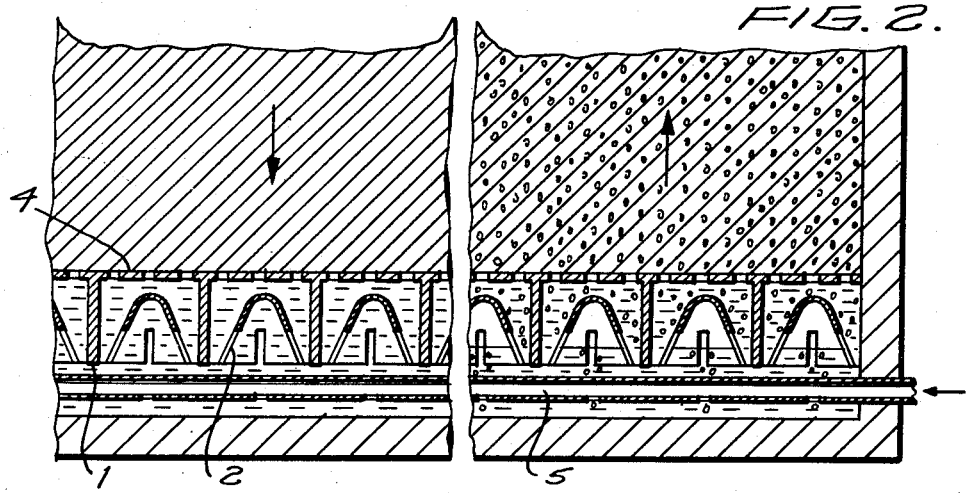
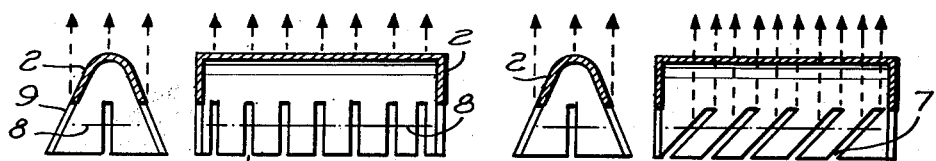
INVENTORS:
JOHANNES KEGEL AND
SIGURD WIRTH
BY

INVENTORS:
JOHANNES KEGEL AND
SIGURD WIRTH
BY

June 14, 1955  J. KEGEL ET AL  2,710,692
FILTER BOTTOMS

Filed July 9, 1951  3 Sheets-Sheet 3

INVENTORS:
JOHANNES KEGEL AND
SIGURD WIRTH
BY

United States Patent Office 2,710,692
Patented June 14, 1955

2,710,692

FILTER BOTTOMS

Johannes Kegel and Sigurd Wirth, Giessen, Germany, assignors to Pintsch Bamag Aktiengesellschaft Application July 9, 1951, Serial No. 235,763
In Germany July 27, 1949

Section 1, Public Law 619, August 23, 1954
Patent expires July 27, 1969

8 Claims. (Cl. 210—130)

The present invention relates to filter bottoms enabling back flushing with a mixture of gas and liquid.

For building up such a filter bottom it has already been suggested using individual elements which when loosely laid one beside the other leave slots between them through which the mixture of gas and liquid may pass for the back flushing. The suggested use of slots, nozzles, or perforated gas chambers, entails however disadvantages, since by the weight of the filter material loaded thereabove, the filter material is often insolubly pressed into the free openings of the nozzles whereby clogging is caused. It has been found that, likewise, the use of immersion tubes is not very favourable, since in practice it is mostly only with difficulty possible to lay the filter bottom completely evenly in a comparatively large size. Moreover, when using filter-jets or perforated chambers for the flushing gas, the construction is limited owing to the fact that always only a limited number of jets or openings for the flushing gas can be used whereby, between the jets or the openings for the flushing gas, elements of the filter material remain which are at a disadvantage during flushing. This circumstance is particularly marked at the edge of the filter since here the element of filter material, which is under a disadvantage during flushing, lies in the zone of friction of the walls. With this construction of filters the edge zones are, thus, in most cases insufficiently flushed and therefore almost always clogged.

It is an object of the invention to provide a filter bottom wherein the openings for the passage for the back flushing gas and liquid are not liable to become clogged.

It is another object to provide a filter bottom which is comparatively inexpensive.

Subsidiary objects of the invention are:

1. To enable the use of available and cheap profiled material for the carrying elements of the filter bottom;

2. To provide, owing to the easy accessibility of the surface, a cheap possibility of improving the surface of the filter bottom in corrosive-chemical respect if the carrying elements consist of metal;

3. To prevent loading of the gas pressure chambers by the filter material and contact between the said chambers and the filter material, whereby clogging of the gas feeding slots is prevented;

4. To provide a construction for the gas pressure chambers so that they are light and have thin walls, whereby their costs are reduced;

5. Alternatively to enable the use of carrying layers;

6. To provide gas pressure chambers which may receive small openings at the top whereby the removal of gas from the chambers after flushing is automatically effected, the said openings being kept so small that the amount of gas escaping therethrough while flushing remains negligible.

With these objects in view the present invention mainly consists in a filtering bottom which comprises a plurality of carrier elements arranged so as to define spaces between adjacent carrier elements; a plurality of elongated gas distributing channel elements arranged underneath the carrier elements, each of the channel elements being open at the bottom end having an upper closed wall portion adapted to be filled with gas, and lower wall portions provided with spaced lateral slots permitting escape of gas; and a plurality of gas feeding means for supplying gas to each of the channel elements arranged underneath the distributing channel elements so that gas escaping from the feeding means passes through the open bottoms of the distributing channel elements into the same filling the upper wall portion of the same and then, passing through the lateral slots in the lower wall portions in the same, rises to the level of the carrier elements so as to pass through the spaces between the same.

Other objects and advantages of the invention will become apparent to those skilled in the art from the following detailed description when read in conjunction with the appended drawings, which are given by way of example and in which:

Fig. 1 is a cross-section through the bed of a filter bottom of the invention;

Fig. 2 is a cross-section through the bed of a filter bottom of the invention with perforated or slotted bottom plates;

Fig. 3 is a longitudinal section through a chamber for compressed gas with slots arranged vertically;

Fig. 3a is a cross-section of the channel shown in Fig. 3;

Fig. 4 is a section through a chamber for compressed gas with slots arranged diagonally in space;

Fig. 4a is a cross-section of the channel shown in Fig. 4;

Figure 5:
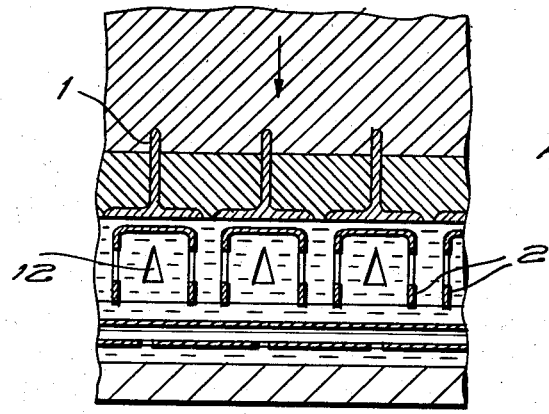
Fig. 5 is a section through a filter bottom of the invention, the carrier elements of which are positioned with ridges directed upwards.

Referring now to the drawings, the numeral 1 designates supporting members, while the numeral 2 designates the chambers for compressed gas. As supporting members for the filtering material, the elements 1 may be provided with solid top portions 3, as shown in Figure 1, or, as shown in Figure 2, may be perforated or slotted, as indicated at 4. Between the carrying profiled bottom members, or underneath the same, chambers for compressed gas are provided which are open at their bottom and of which embodiments are illustrated in Figs. 3 and 4. The chambers for the compressed gas receive a correctly adjusted amount of gas by means of a central gas feeding tube 5, while the flushing liquid is introduced at an arbitrary place underneath the filter bottom and passes unimpeded by the carrying profiled bottom members, and without loss of pressure, into the filter bed. The chambers 2 are provided with spaced vertically extending slots 6, or, alternatively, with spaced diagonal slots 7, as shown in Figure 4.

The filter bottom of the invention acts as follows:

During filtering, the chambers for the compressed gas are dead as shown in the left-hand sides of Figs. 1 and 2, the uniform distribution of the medium to be filtered being ensured in known manner by the loss of pressure of the filter material. On flushing back, the distributing channel elements 2 for the compressed gas, which are open at their bottom, receive the required amount of flushing gas through the central gas feeding tube 5 already mentioned as is shown in the right-hand sides of Figs. 1 and 2. The flushing gas is distributed completely evenly in the closed upper wall portion of the gas channel 2 through the entire length, and quite independently of whether little or much flushing gas is being used. It displaces thereby the liquid and slowly urges the liquid level 8 downwards, and thus reaches the gas flushing slots, the same being automatically more or less uncovered according to the used amount of flushing gas, as indicated at 9. By the use of slots or recesses, unavoidable deviations in the level of the gas chambers from the horizontal are of minor importance, since a subdivision into a plurality of gas chambers acting independently of one another is provided. Thereby, it is achieved that the back flushing by the gas as well as the back flushing by the liquid commences and comes to rest, with regard to space and time, completely evenly along the entire filter surface. A great advantage of this filter bottom arrangement resides also in the fact that the edge zones 10 of the filter are acted upon excessively strongly by using chambers of special shapes for the compressed gas, as indicated at 11.

If the recesses are arranged within the wall surfaces of the chambers for the compressed gas, a more stable construction of the walls is obtained than with the arrangement of slots extending towards the edge, so that no indentations can occur. Moreover, the gas distributing chambers may be arranged in any arbitrary position beneath the surface of the carrier elements so that the same are not only provided under the slots of the carrier elements.

Figure 9:
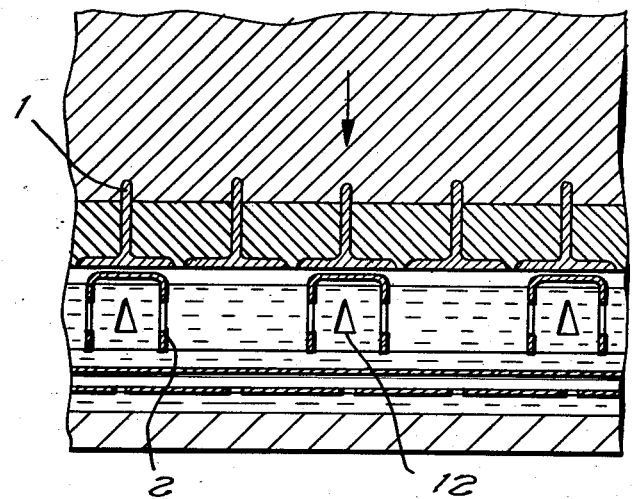
Fig. 9 is a section through a modified embodiment.

In connection with the novel filter bottom, there may also be used as carrier elements carriers of concrete, which may be reinforced concrete carriers, whose reinforcing irons are kept shorter than the length of the reinforced concrete carrier itself so that the irons do not penetrate through the frontal sides of the carrier. This construction as reinforced concrete carrier is of particular significance. When the T-shaped carriers or the carriers of reinforced concrete are placed with their webs upwards as shown in Fig. 9, it is sufficient to allocate only one gas distributing chamber to each second carrier.

Figure 6:
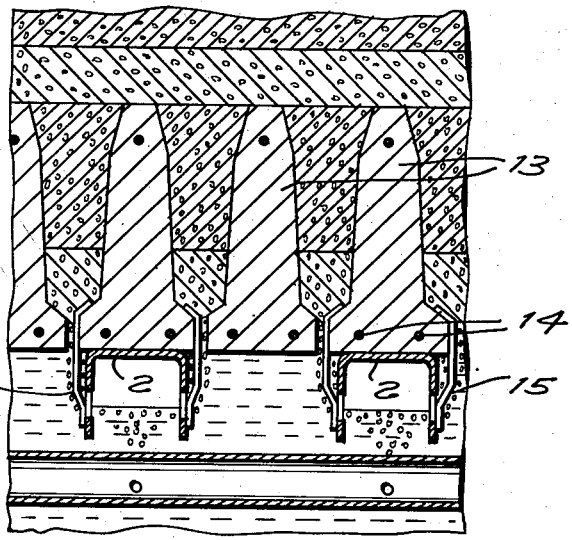
Fig. 6 is a section through carrier elements constructed as carriers of reinforced concrete.
Figure 7:
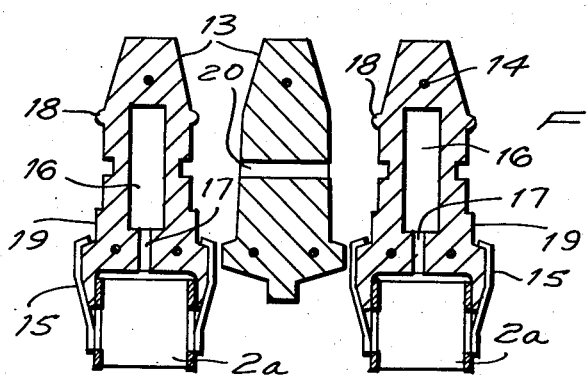
Fig. 7 illustrates carriers of reinforced concrete in section.
Figure 8:
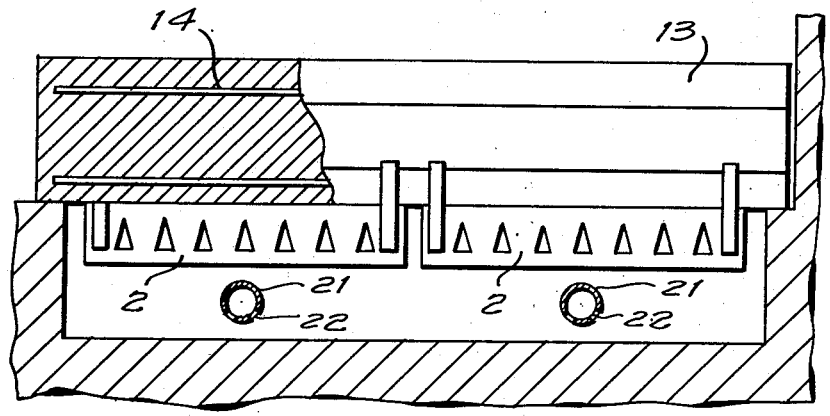
Fig. 8 illustrates the arrangement of the carriers of reinforced concrete with gas distributing chambers, partly in section and partly in elevation.

The use of reinforced concrete carriers, as shown in Figs. 6, 7 and 8, for the formation of filter bottoms is novel in the technique of purifying water, and they have considerable advantages over T-shaped irons hitherto used. Moreover, the novel filter bottom is economically more favourable, since carrier layers, supporting layers, and blocking layers are essentially more expensive than concrete. The filter bottom itself, with the carrying layers, may have a smaller height whereby to keep available the total height of the filter for the filtering material proper which rests on the said layers.

As the carrier elements made of concrete have a corresponding weight perforations or notches are provided thereon whereby the attachment of hooks or the like is enabled which are required for lifting the carriers and, thus, facilitating mounting of the carriers. It is also possible to form the upper part of the gas distributing chambers by the carrier elements themselves whereby likewise a reduction of costs in the manufacture of the filter bottom is obtained, since, as a rule, the manufacture of the gas distributing chambers themselves is more expensive than that of the carrier elements.

With respect to the material used for the gas distributing chambers, the same may consist of metal or plastic material which does not transfer any soluble, smelling, or tasting particles to the liquid to be filtered.

In order to enable a simple and secure connection of the gas distributing chambers to the carrier elements, the gas distributing chambers are provided with biased clips of metal or plastics.

Furthermore, according to a feature of the invention, the arrangement may be such that the ridge-like part of the carrier element receives groove-like, ridge-like or step-like formations for facilitating the orderly introduction of the granular material for the carrying, supporting and blocking layers.

For facilitating building-in of the gas distributing chambers and of the carrier elements, the arrangement may be such that these are longitudinally subdivided independently of one another.

As shown in Fig. 5, the filter bottom may be composed of profiled carrier elements 1 which consist of T-shaped carriers the ridges of which are directed upwards. The flanges of the T-shaped carriers leaving intermediate narrow elongated spaces between them through which the mixture of gas and liquid can escape upwards. Beneath the flanges of the carrier elements 1, the gas distributing channels 2 are provided. The openings 12 may have any shape and are provided within the surface of the wall of the gas distributing chambers 2. In the arrangement illustrated in Fig. 5, the ridges of the carrier elements 1 are directed upwards and the carrier layer of the filter bottom is spread and held between these ridges, and one is at liberty to arrange the gas distributing chambers beneath these carrier elements in any suitable manner.

Instead of making the carrier elements from T-shaped profiles, according to another feature of the invention, the carrier elements may be constructed as concrete carriers and more especially as reinforced concrete carriers 13, the arrangement being such that their reinforcing irons 14 are, as is shown in Fig. 8, kept shorter than the length of the reinforced concrete carriers 13 themselves. Due to the peculiar shape of the cross-section of these reinforced concrete carriers 13, the possibility exists of being able to connect the gas distributing chambers 2 suitably to the carriers by means of the holding clips 15, in which case, as shown in Fig. 7, the lower part of the reinforced concrete carriers 13 may simultaneously serve as upper termination of the gas distributing chambers 2a which are open at the top. As can further be seen from the cross sectional shapes of the reinforced concrete carriers 13 illustrated in Fig. 7, the same have channel-like cavities 16 which are used for feeding the gas to the gas distributing chambers. The gas enters through the opening 17 into the gas distributing chambers 2a. When choosing the material for the gas distribution chambers 2, 2a, it is to be kept in mind that the same should consist of metal or of plastic material which does not transfer soluble, smelling or tasting particles to the liquid to be filtered. For a simple attachment of the clips 15 holding the gas distributing chambers 2 to the carrier elements 13, the clips are so constructed that they are biased and thereby may easily be pushed over the projections of the carrier elements 13 and are held in position by the said projections. Since the weight of the reinforced concrete carriers 13 is considerable, means have also to be provided for enabling the same to be removed from the filter bottom, especially also for facilitating an orderly introduction of the granular material of the carrier, supporting and blocking layers, the carrier elements comprising ridge shaped or stepped projections 18 or 19 respectively. For facilitating lifting of the reinforced concrete carriers 13, the same have been provided with perforations 20.

As can be seen from Fig. 8, the gas distributing chambers 2 are longitudinally subdivided relatively to the length of the reinforced concrete carrier element 13, whereby to facilitate the assembly. Underneath the gas distributing chambers 2, the gas feeding tubes 21 are provided, which have holes 22 for the escape of the gases.

On flushing back the filter bottom, the gas distributing chambers 2, which are open at the bottom, receive the necessary amount of flushing gas through the gas feeding tubes 21, and the flushing process is then performed in known manner.

The hitherto known back flushing bottoms cause the mixture of gas and liquid for back flushing, although evenly distributed along the filtering surface, to escape jerkily. The novel filter bottom herein proposed, on the contrary, distributes the mixture for back flushing completely continuously in the extension of the surface, and therefore, compared with the hitherto known filter bottoms, approaches in its effect more closely to what is ultimately achievable. This is particularly true, if the gas distributing slots are arranged in a space diagonal 7, as can be seen from Fig. 4.

While in the foregoing we have described some specific embodiments of our invention, it should be clearly understood that we do not wish to be limited to these embodiments. It will be clear to those skilled in the art that many modifications, additions and omissions are possible without departing from the spirit of our invention.

We claim:

1. A filtering bottom comprising in combination a plurality of elongated carrier elements arranged side by side so as to define narrow elongated spaces between adjacent carrier elements; a plurality of parallel elongated gas distributing channel elements, each channel element arranged parallel to and underneath one of said narrow elongated spaces, each of said channel elements being open at the bottom and having an upper portion adapted to be filled with gas, and a lower portion provided with lateral slots permitting escape of gas; and gas feeding tube means arranged normal to said channel elements, said feeding tubes being formed with perforations spaced over the length thereof for supplying gas to said channel elements so that gas escaping from said feeding tube means passes into said distributing channel elements filling said upper portion of the same and then, passing through said lateral slots in said lower portions in the same, rises to the level of said carrier elements so as to pass through said spaces between the associated carrier element and the carrier elements adjacent thereto.

2. A filtering bottom as claimed in claim 1, wherein the carriers are T-shaped in cross-section.

3. A filtering bottom as claimed in claim 1, wherein the carrier elements are formed as concrete carriers.

4. A filtering bottom as claimed in claim 1, wherein the upper portions of the gas distributing channel elements are formed by the carrier elements themselves.

5. A filtering bottom as claimed in claim 1, wherein biased clips of resilient material are provided on the carrier elements for fixing the distributing channel elements to the carrier elements.

6. A filtering bottom comprising in combination a plurality of carrier elements arranged so as to define spaces between adjacent carrier elements; a plurality of elongated gas distributing channel elements arranged underneath said carrier elements, each of said channel elements being open at the bottom and having an upper closed wall portion adapted to be filled with gas, and lower wall portions provided with spaced lateral slots permitting escape of gas; and gas feeding means for supplying gas to each of said channel elements arranged underneath said distributing channel elements so that gas escaping from said gas feeding means passes through said open bottoms of said distributing channel elements into the same filling said upper wall portion of the same and then, passing through said lateral slots in said lower wall portions in the same, rises to the level of said carrier elements so as to pass through said spaces between the same.

7. A filtering bottom as claimed in claim 6, wherein said channel elements have an inverted V-shaped cross-section, and wherein said lateral slots are located in planes extending normal to the longitudinal extension of said channel elements.

8. A filtering bottom as claimed in claim 6, wherein said channel elements have an inverted V-shaped cross-section and wherein said lateral slots are equally spaced apart over the length of said channel elements and located in transversal planes extending inclined with respect to the longitudinal extension of said channel elements.

References Cited in the file of this patent

UNITED STATES PATENTS

| 653,160 | Williamson | July 3, 1900 |
|---|---|---|
| 668,344 | Wilson | Feb. 19, 1901 |
| 801,810 | Parmelee | Oct. 10, 1905 |
| 829,113 | Leopold | Aug. 21, 1906 |
| 897,745 | Jager | Sept. 1, 1908 |
| 1,114,763 | Hodkinson | Oct. 27, 1914 |
| 1,142,270 | Reisert | June 8, 1915 |
| 1,189,521 | Allen | July 4, 1916 |
| 1,544,617 | Wagner | July 7, 1925 |
| 2,245,589 | Hughes | June 17, 1941 |
| 2,439,764 | Walker | Apr. 13, 1948 |

FOREIGN PATENTS

| 9,746 | Great Britain | 1913 |
|---|---|---|
| 772,664 | France | Aug. 18, 1934 |